United States Patent [19]

Bernard

[11] 4,323,950
[45] Apr. 6, 1982

[54] ELECTROLYTIC CAPACITOR WITH HIGH-PURITY ALUMINIZED CATHODE

[75] Inventor: Walter J. Bernard, Williamstown, Mass.

[73] Assignee: Sprague Electric Company, North Adams, Mass.

[21] Appl. No.: 89,823

[22] Filed: Oct. 31, 1979

[51] Int. Cl.³ .......................... H01G 9/00; B01J 17/00
[52] U.S. Cl. ........................................ 361/433; 29/570
[58] Field of Search .......................... 361/433; 29/570

[56] References Cited

U.S. PATENT DOCUMENTS

| Re. 25,084 | 11/1961 | Brennan | 361/433 |
|---|---|---|---|
| 1,850,298 | 3/1932 | Washington | 361/433 |
| 1,925,307 | 9/1933 | Deboer et al. | 361/433 |
| 2,049,553 | 8/1936 | Weaver | 361/433 |
| 2,104,018 | 1/1938 | Brennan | 361/433 |
| 2,280,789 | 4/1942 | Brennan | 361/433 |
| 2,547,371 | 4/1951 | Brennan . | |
| 2,551,869 | 5/1951 | Brennan . | |
| 2,616,165 | 11/1952 | Brennan | 361/433 |
| 2,653,119 | 9/1953 | Brennan | 361/433 |
| 2,786,172 | 3/1957 | Whitby | 361/433 |
| 3,346,789 | 10/1967 | Robinson . | |
| 3,697,822 | 10/1972 | Alwitt et al. | 361/433 |

FOREIGN PATENT DOCUMENTS

| 686293 | 1/1953 | United Kingdom . |
| 723693 | 2/1955 | United Kingdom . |
| 817892 | 8/1959 | United Kingdom . |

Primary Examiner—Andrew J. James
Attorney, Agent, or Firm—Connolly and Hutz

[57] ABSTRACT

An electrolytic capacitor has a cathode electrode produced by depositing aluminum on a porous high surface-area dielectric substrate as a layer at least 2000 Å thick on each surface.

4 Claims, 3 Drawing Figures

ELECTROLYTIC CAPACITOR WITH HIGH-PURITY ALUMINIZED CATHODE

BACKGROUND OF THE INVENTION

This invention relates to aluminum cathodes for electrolytic capacitors. More particularly it relates to a high purity aluminum cathode for electrolytic capacitors made by depositing aluminum on a porous high surface-area dielectric spacer.

Aluminum cathodes are used in both aluminum and tantalum foil wound electrolytic capacitors. Generally, the aluminum foil used for cathodes is of a lower purity (less costly) than that used for anodes. In some instances, after the etching of lower purity cathode foil, residual copper is left on the surface. There are processes that have been devised for removing this residual copper, e.g., washing the etched foil in nitric acid. However, there are applications in which high-purity cathodes are required, and, generally, high-purity foil has been necessary to make the cathodes for these applications.

Aluminum anodes and cathodes for capacitors have been produced in the prior art by spraying high-purity aluminum on calendered kraft paper or gauze. Metallized paper and plastic films have also been used in capacitors. Sprayed particles are irregular, producing rough and uneven coatings that are unsatisfactory for the present application, inasmuch as sprayed layers are too coarse, will not conform precisely to the surface of a porous paper, and thus do not have the high cathode capacitance required.

Prior art metallized papers and films are smooth, and the metallization is too thin, particularly those with self-healing characteristics that typically have 200–400 Å thicknesses. Those thicknesses do not provide the high surface conductance required for the present invention.

The cathode material of the present invention would not be used in a self-healing capacitor, as the deposited metal is too thick. An important factor is that the prior art metallized papers and films themselves are not porous enough and are too smooth to provide the convoluted, high surface-area required for this invention.

SUMMARY OF THE INVENTION

A high-purity aluminum cathode for electrolytic capacitors is provided by depositing aluminum, preferably by vacuum deposition, in a layer at least 2000 Å thick on each surface of a porous, high-surface area dielectric substrate, preferably a non-calendered Manila paper strip.

The aluminum deposit should be thin enough to utilize the fine structure of the paper substrate, yet thick enough to maintain continuity for good conductivity. In addition, the paper is metallized on both sides so that there is contact throughout the porous paper forming a highly random, high-surface area structure. The resulting structure is analogous to etched aluminum foil with its tubular etch structure, conventionally used as cathode foil, and unlike commercial metallized paper that has a smoother, regular surface. Thus, the paper serves as a substrate only, and the fine metallized tubular fibers can be impregnated by the electrolyte throughout to utilize the high surface area of the metallized tubular fibers. Spacer material is used between anode and cathode in the final capacitor, as with a conventional foil cathode, to prevent short-circuiting and to absorb electrolyte.

A capacitor section of the present invention consists of one or two sheets of the metallized paper as the cathode wound with anodized valve-metal foil, preferably aluminum, with interleaved spacers, and with known electrode terminations.

DESCRIPTION OF THE PREFERRED EMBODIMENTS

Figure 1:
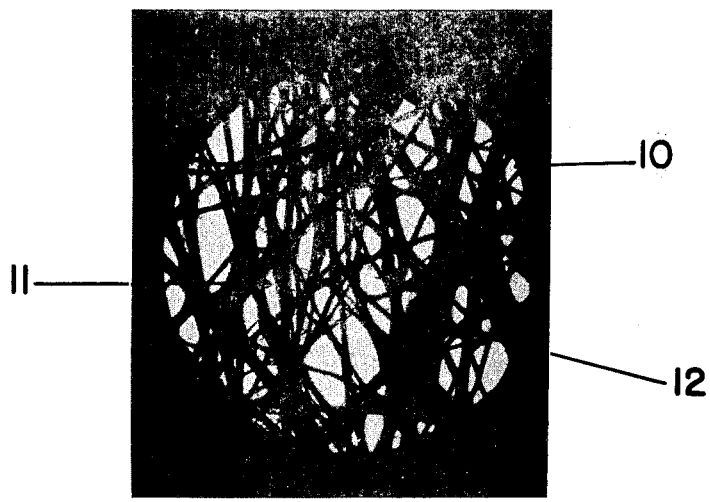
FIG. 1 is a photomicrograph of the high-purity cathode material of the present invention at 100× magnification.
Figure 2:
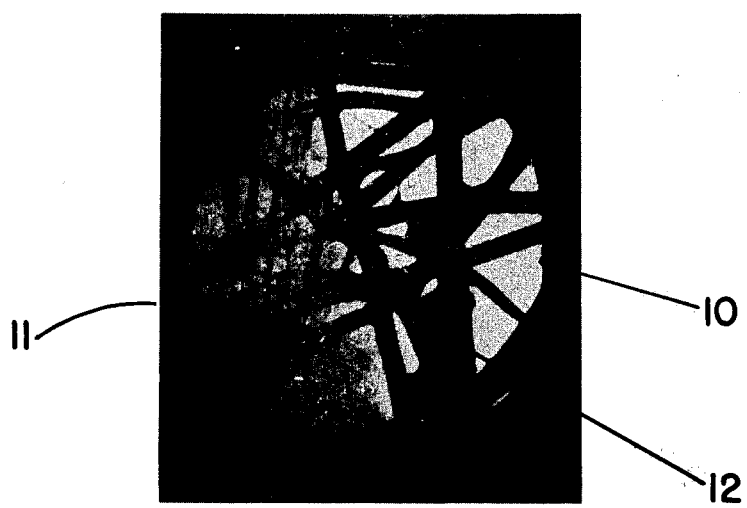
FIG. 2 is the same material at 400× magnification with a portion of the paper masked to prevent metallization, for illustrative purposes.

The porous, high-surface area cathode material 10 is shown in FIGS. 1 and 2 respectively at 100× and 400× magnification. The lighter strands 11 are portions of Manila fibers that were masked and thus have substantially no aluminum on their surface, while the dark strands 12 are the aluminized Manila fibers. The white areas are open spaces in the porous aluminized Manila paper material. Electrolytic grade Manila paper is porous and rough surfaced and is preferably aluminized on both sides to provide an aluminum layer at least 2000 Å thick on each of the two sides.

The resulting structure is different from prior art in that the aluminum extends through the paper forming a continuous metal strip as substantially all the fibers are coated. Thus, the aluminized fibers 12 form continuous cathode surface of high surface area. The structure differs from prior art structures in that the deposited aluminum is approximately ten times thicker, and, as a result, it can not be used as a self-healing cathode.

Figure 3:
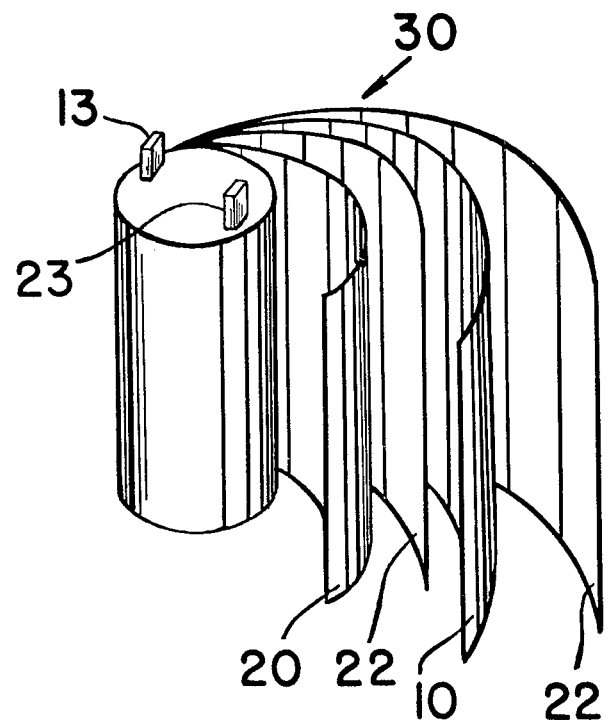
FIG. 3 is a view of a capacitor section, partially upwound, utilizing the high-purity cathode material of the present invention.

A wound capacitor section 30, partially unrolled, as shown in FIG. 3, consists of at least one sheet and preferably two sheets, of aluminized Manila paper as cathode 10, wound with anode foil 20 and interleaved spacers 22. Electrode terminations 13 and 23 are connected to the cathode 10 and anode 20.

EXAMPLE 1

Laboratory capacitors were made using cathodes of single sheets of 1.5 and 2 mil Manila paper onto which aluminum had been evaporated to various thicknesses. Aluminum foil anodized to 26 V was used as anode with an ammonium pentaborate-ethylene glycol electrolyte. Results are compared with capacitors having the same anode and electrolyte, but with conventional etched 98% purity aluminum cathode foil as control, with electropolished plain foil, and with electrolyte impregnated commercial metallized paper.

| Cathode | Capacitance ($\mu$F) | % Capacitance | ESR ($\Omega$) |
| --- | --- | --- | --- |
| 2 mil etched Al foil | 341 | 100 | 0.48 |
| 3 mil electro-polished Al foil | 114 | 33 | 2.21 |
| 1.5 mil Manila + 200 Å Al | 101 | 30 | 2.97 |
| 0.25 mil commercial metallized paper | 141 | 41 | 8.09 |

| Cathode | Capacitance (μF) | % Capacitance | ESR (Ω) |
|---|---|---|---|
| 1.5 mil Manila + 1000 Å Al | 179 | 53 | 1.96 |
| 2 mil Manila + 2000 Å Al | 260 | 76 | 1.14 |

As is seen above, increasing metal thickness improved ESR. However, greater thicknesses of metal did not give the increment of improvement on a single sheet of Manila that was obtained by increasing the thickness from 1000 Å to 2000 Å.

A different way of increasing cathode capacitance, and hence total capacitance, is to increase cathode area. This can be achieved by the use of two sheets of aluminized paper.

EXAMPLE 2

Laboratory capacitors were made using two sheets of 1.5 mil Manila paper, for a total cathode thickness of 3 mils, aluminized to 3000 Å. The greater thickness of metallization was used to improve the ESR of the capacitors. The control capacitors were made with 2 mil etched 98% purity aluminum cathode foil.

| Anode Formation Voltage | Control | | Experimental | | % Cap. |
|---|---|---|---|---|---|
| | Cap. (μF) | ESR (Ω) | Cap. (μF) | ESR (Ω) | |
| 26 | 341 | 0.48 | 320 | 1.00 | 94 |
| 130 | 49 | 1.32 | 49 | 1.47 | 100 |
| 150 | 34 | 1.93 | 34 | 2.38 | 100 |
| 235 | 17 | 6.15 | 16 | 6.20 | 93 |

Thus, the aluminized Manila paper forms an acceptable substitute for cathode foil where a high-purity cathode is required, without the expense of using high-purity etched aluminum foil.

Other ways of depositing the aluminum may be used other than vacuum deposition to provide approximately atomic sized particles that conform precisely to the porous paper fibers and provide the high surface conductance required. As mentioned before, sprayed-on particles are too coarse for the present application. If they were much finer, they would also oxidize rapidly during deposition giving a mixed aluminum-aluminum oxide layer. Other non-conducting substrates may be used, such as glass-fiber paper or other wide-open structure, in which case metallized layers as thick as 5000 Å may be used to utilize all of the structure to produce high-surface area layers. With Manila paper, the preferable thickness is 2000–3000 Å as a thicker layer, e.g. 5000 Å, is unnecessary for the desired result and, therefore, uneconomical.

What is claimed is:

1. An electrolytic capacitor comprising a pair of convolutely wound electrodes with interleaved spacers in contact with an electrolyte, one of said electrodes being an anode and bearing a barrier dielectric oxide on the surface thereof, the other of said electrodes being a cathode of at least one sheet of a porous, non-calendered, high surface-area continuous substrate onto which aluminum has been deposited other than by spraying in a layer of about 2000 Å to 5000 Å thickness on each surface of said substrarte to provide a continuous high-purity cathode strip.

2. A capacitor according to claim 1 wherein said substrate is Manila paper.

3. A capacitor according to claim 2 wherein said metallized layer is about 2000 Å to 3000 Å thickness.

4. A capacitor according to claim 1 wherein said aluminum is vacuum deposited on said substrate.

* * * * *